US007129483B2

(12) United States Patent
Youngquist et al.

(10) Patent No.: US 7,129,483 B2
(45) Date of Patent: Oct. 31, 2006

(54) LASER DESORPTION AND IONIZATION MASS SPECTROMETER WITH QUANTITATIVE REPRODUCIBILITY

(75) Inventors: Michael G. Youngquist, Palo Alto, CA (US); Craig A. Keller, Menlo Park, CA (US)

(73) Assignee: Ciphergen Biosystems, Inc., Fremont, CA (US)

( * ) Notice: Subject to any disclaimer, the term of this patent is extended or adjusted under 35 U.S.C. 154(b) by 0 days.

(21) Appl. No.: 11/155,302

(22) Filed: Jun. 17, 2005

(65) Prior Publication Data

US 2005/0279929 A1 Dec. 22, 2005

Related U.S. Application Data

(60) Provisional application No. 60/581,997, filed on Jun. 21, 2004.

(51) Int. Cl.
*B01D 59/44* (2006.01)
*H01J 49/40* (2006.01)
*H01J 49/00* (2006.01)

(52) U.S. Cl. ...................... 250/288; 250/287; 250/300; 250/306; 250/307; 250/309

(58) Field of Classification Search ................. 250/288
See application file for complete search history.

(56) References Cited

U.S. PATENT DOCUMENTS 6,580,070 B1 * 6/2003 Cornish et al. ............. 250/287
6,833,545 B1 * 12/2004 Axelsson .................... 250/297
2004/0108451 A1 * 6/2004 Hansen ....................... 250/281
2005/0017174 A1 * 1/2005 Chism, II ................... 250/307
2005/0056776 A1 * 3/2005 Willoughby et al. ........ 250/281
2005/0230612 A1 * 10/2005 Weber ........................ 250/287
2005/0279929 A1 * 12/2005 Youngquist et al. ........ 250/288

* cited by examiner

*Primary Examiner*—John R. Lee
*Assistant Examiner*—Bernard E. Souw
(74) *Attorney, Agent, or Firm*—Townsend and Townsend and Crew LLP; Gerald T. Gray

(57) ABSTRACT

Laser desorption/ionization time-of-flight mass spectrometer ("LDI-TOF-MS") devices, and methods, that accurately measure the mass of analytes contained in a sample and which also measure the quantities of analytes present in a sample in a consistent manner from instrument-to-instrument and over time on a single instrument. In particular, the invention provides LDI-TOF-MS devices and methods in which: 1) the energy of the laser pulse and the area of the sample illuminated (fluence) is consistent and controlled so as to produce consistent conditions for analyte desorption and ionization; 2) the mass analyzer behaves in a reproducible manner; and 3) the detection system produces a signal that consistently represents the arrival of ions of different masses.

41 Claims, 7 Drawing Sheets

Instrument #1

LASER DESORPTION AND IONIZATION MASS SPECTROMETER WITH QUANTITATIVE REPRODUCIBILITY

CROSS-REFERENCES TO RELATED APPLICATIONS

This application claims the benefit of U.S. Provisional Application 60/581,997, filed Jun. 21, 2004, titled "LASER DESORPTION AND IONIZATION MASS SPECTROMETER WITH QUANTITATIVE REPRODUCIBILITY", which is hereby incorporated by reference in its entirety.

BACKGROUND OF THE INVENTION

The present invention relates in general to mass spectrometers, and in particular to laser desorption/ionization time-of-flight mass spectrometers ("LDI-TOF-MS").

Mass spectrometers can be excellent analytical tools for the detection and differentiation of analytes. As such, they have found increasing use in the analysis of biomolecules and, in particular, proteins. However, mass spectrometry has fallen short as a tool for quantitative biomolecular assays. This is mainly due to the fact that mass spectrometers do not perform with sufficient quantitative reproducibility from assay-to-assay. Furthermore, different mass spectrometers can produce different quantitative results given substantially similar samples and data acquisition protocols.

This drawback must be overcome if mass spectrometers are to become useful as assay platforms for proteins and, in particular, protein patterns. For example, scientists have found that protein profiles can provide better diagnostic power than single proteins in detecting disease. Mass spectrometers can be used to generate the protein profiles of both the afflicted individual and the reference populations, and a successful diagnosis is facilitated if the response of the mass spectrometers used are well matched. In particular, it is advantageous if the mass spectrometers used to generate protein profiles generate substantially similar masses and detected quantities for each protein present in substantially similar samples. It is further desirable that these results be of high quality, maximizing figures of merit such as signal-to-noise ratio and resolution. It is further desirable that the process of adjusting parameters to cause instruments to produce standard outputs be substantially automated.

Laser desorption time-of-flight mass spectrometry (TOF-MS) is particularly useful for protein profiling because it enables the detection of proteins with masses as high as hundreds-of-thousands of Daltons. This method involves using a laser to desorb and ionize analyte molecules from a surface, accelerating ions to a particular energy and then measuring the time required to traverse a free-flight path of fixed length to a detector. Since lighter ions arrive at the detector before heavier ions, a time record of the arrival times can then be converted into a mass spectrum. As is the case with most mass spectrometers, an LDI-TOF-MS includes three major components: (1) an ion source, (2) a mass analyzer, and (3) a detection system.

BRIEF SUMMARY OF THE INVENTION

The present invention provides LDI-TOF-MS devices that not only accurately measure the mass of analytes contained in a sample but which also measure the quantities of analytes present in a sample in a consistent manner from instrument-to-instrument and over time on a single instrument. In particular, the invention provides for a LDI-MS in which: 1) The energy of the laser pulse and the area of the sample illuminated (fluence) is consistent and controlled so as to produce consistent conditions for analyte desorption and ionization; 2) The mass analyzer behaves in a reproducible manner; and 3) The detection system produces a signal that consistently represents the arrival of ions of different masses.

According to an aspect of the invention, a laser desorption mass spectrometer device is provided. The device typically includes an optical assembly comprising a laser and optical elements configured to deliver a laser pulse having a controllable energy over a controllable area of a sample presenting surface, wherein the pulse delivered to the sample presenting surface desorbs and ionizes analyte molecules from the surface. The device also typically includes a detector having a controllable gain configured to detect desorbed and ionized analyte molecules from the surface, means for automatically controlling the energy of the laser pulse delivered to the sample presenting surface, means for automatically controlling the area of the sample presenting surface illuminated by the laser pulse, and means for automatically controlling the gain of the detector.

According to another aspect of the present invention, a method is provided for setting operating parameters of a laser desorption mass spectrometer device. The method typically includes providing a mass spectrometer device having an optical assembly comprising a laser and optical elements configured to deliver a laser pulse having a controllable energy over a controllable area of a sample presenting surface, wherein the pulse delivered to the sample presenting surface desorbs and ionizes analyte molecules from the surface. The device also typically includes a detector having a controllable gain configured to detect analyte molecules desorbed from the surface and ionized, means for automatically controlling the energy of the laser pulse delivered to the sample presenting surface, means for automatically controlling the area of the sample presenting surface illuminated by the laser pulse, and means for automatically controlling the gain of the detector. The method also typically includes automatically controlling at least one of the following: (1) the energy of the laser pulse delivered to the sample presenting surface; (2) the area of the sample presenting surface illuminated by the laser pulse; and (3) the gain of the detector.

According to yet another aspect of the present invention, a method is provided for generating a composite time-of-flight spectrum. The method typically includes delivering a laser pulse having an energy to an analyte sample on a sample presenting surface to desorb and ionize analyte from the surface, measuring the energy of the laser pulse, detecting desorbed and ionized analyte and generating a time-of-flight spectrum of the detected analyte. The method also typically includes evaluating the measured energy based on an energy acceptance criterion and including the time-of-flight spectrum into a composite spectrum if the energy acceptance criterion is met. In another aspect, the method typically includes evaluating the spectrum based on a spectrum acceptance criterion, and including the time-of-flight spectrum into a composite spectrum if the acceptance criteria for both the time-of-flight spectrum and the measured energy are met.

For a further understanding of the nature and advantages of the present invention, reference should be made to the following description taken in conjunction with the accompanying drawings.

DETAILED DESCRIPTION OF THE INVENTION

Figure 1:
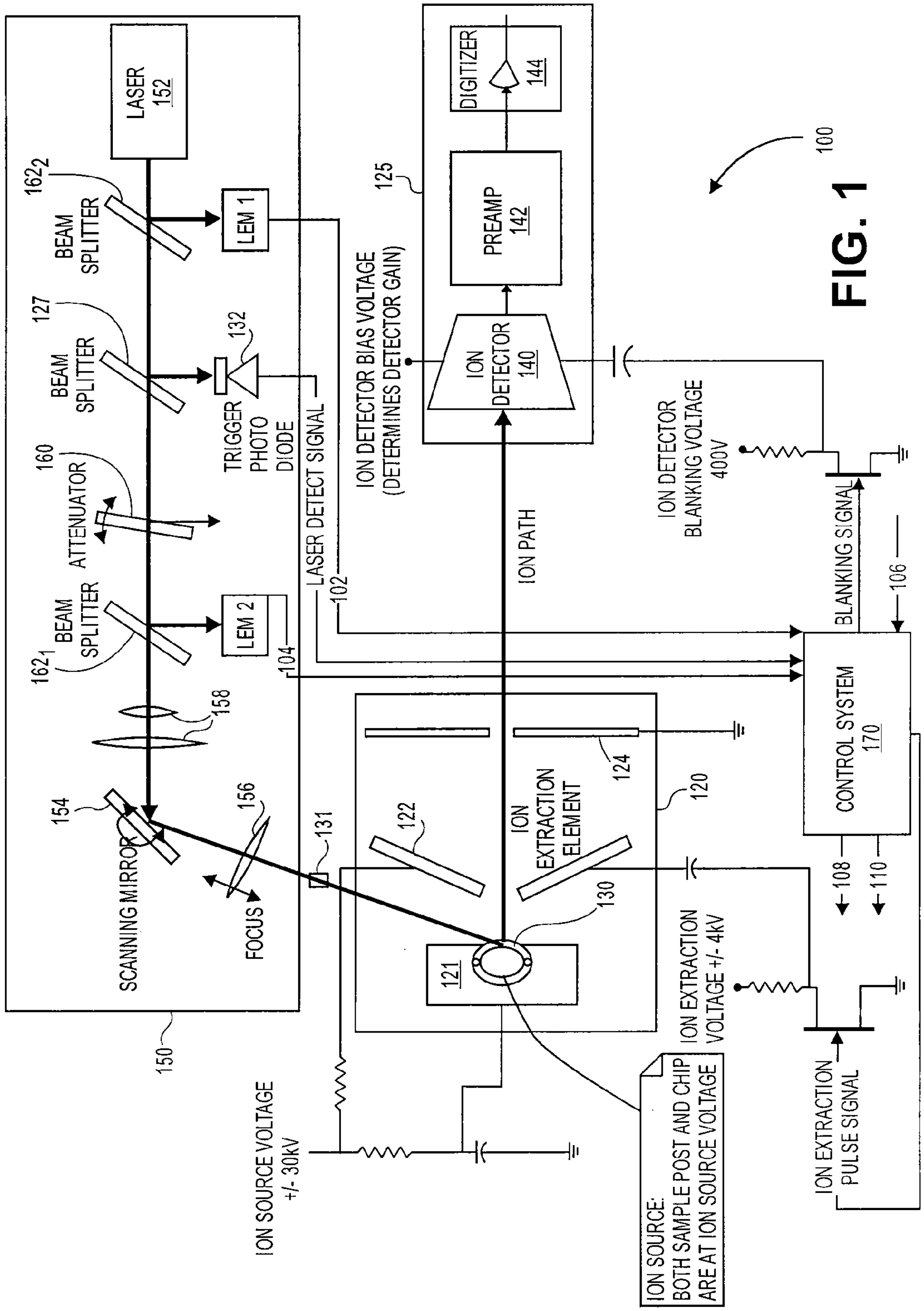
FIG. 1 is a block diagram of an embodiment of an LDI-MS device in accordance with the present invention.

Mass spectrometers, like other analytic instruments, tend to exhibit variance in performance both in the same instrument over time and between different instruments. Such variance may not impair an instrument's utility in the context of analytic studies in which qualitative, rather than quantitative, information is sought. However, for tests in which quantitative results may be important, and in which such results need to be comparable over time or between different instruments decreasing this variance on a single instrument over time and among multiple instruments is highly desirable. For both single instrument and multiple instrument comparison of results, it is desirable that the instrument or instruments produce quantitatively reproducible results on tests from substantially identical samples. In particular, for instruments intended for clinical use, in which quantitative results are used to help make medical decisions, such reproducibility is highly relevant.

Given an adequate foundation in instrument design and assembly and in sample preparation, reproducibility among instruments depends on the ability to match instruments by adjusting instrument control parameters. Similarly, reproducibility for a single instrument depends in part on the ability to detect and compensate for changes in instrument control parameters over time. Instrument control parameters that may significantly affect reproducibility and performance of a LDI-TOF-MS include: laser pulse energy, laser focus, ion collection efficiency and stability of the analyzer, and sensitivity and gain of the detection system. Laser pulse energy determines the number of photons directed at the sample source. Laser focus determines the area of the sample into which the photons are directed. Together these two parameters determine the fluence of the desorption generating light pulse and largely determine how many ions are created from a particular sample. The simplest and perhaps only way to build an analyzer that exhibits collection efficiency characteristics substantially independent of the sample and desorption conditions is to design it to collect substantially all ions generated in the source, or perhaps better, all ions within a defined range of kinetic energies, and deliver them to the detector. The sensitivity of the detection system for a particular ion is the probability that a signal is generated for that ion. The gain of the detection system determines the magnitude of the output signal generated for detected ions. Improving the match of these parameters among instruments improves instrument-to-instrument reproducibility. Also, compensating for changes in these parameters over time (e.g., laser drift or aging of the detector) in a single instrument improves the reproducibility of measurements performed on a single instrument.

It should be appreciated that some instrument parameters can be adequately controlled by design, such as, for example, the laser energy and angular acceptance of the analyzer. Also, some instrument parameters, such as laser energy, may be made adjustable or tunable to achieve adequate instrument-to-instrument matching or simply to handle different types of samples. Furthermore, some instrument parameters may be carefully controlled by design and then, because a high degree of accuracy is required, any remaining deviation may be removed by calibration against accurate standards. For example, in a TOF-MS, instrument-to-instrument variations in the length of the flight path and of the acceleration voltage are typically removed by calibrating the flight time as a function of mass using standards of known mass.

Another aspect of achieving quantitative reproducibility in a mass spectrometer is to ensure that none of the signals averaged or summed to generate a composite spectrum signal are clipped by exceeding the valid signal levels of the detection system. This can be achieved in several ways including 1) increasing the dynamic range of the detection system, and 2) discarding clipped signals before they are included in the average or sum.

In some existing LDI TOF-MS instruments, the user has direct run-time control over laser intensity and signal amplification. In addition, a user or service technician can manually adjust the focus of the laser. Attempting to make the signal intensity reproducible among instruments or over a long period of time in a single instrument is at best a time-consuming task and at worst counter-productive. Unless done systematically, attempts to adjust parameters to match the signal amplitude of separate instruments can degrade performance. This is because adjusting any one parameter to closely match signal amplitude for a given analyte may adversely affect other figures of merit such as resolution, signal-to-noise ratio, or the matching of the signal amplitudes of other analytes. For example, users often choose to match signal amplitude by increasing the laser intensity on a "less sensitive" instrument when better results might be achieved by adjusting the laser focus or the detector gain. In general, it is necessary to systematically adjust all of the parameters to approach the best possible performance and to achieve acceptable reproducibility. Such control parameters are typically adjustable by a user or a control system. In one aspect, such control parameters are automatically adjusted by the control system to achieve the desired reproducibility. In another aspect, a user may be alerted to the need to manually adjust a control parameter to a desired level or into a desired range.

I. Laser Desorption/ionization Mass Spectrometer: Laser Pulse Energy Illuminated Area and Detector Gain The embodiments of the present invention provide laser desorption/ionization mass spectrometers exhibiting improved reproducibility (diminished variance) in measurements performed with these spectrometers both over time and between different mass spectrometers. This improved reproducibility results, in one aspect, from providing a mass spectrometer with means to automatically control and set instrument parameters such as the laser energy delivered to the sample target, the area on the target to which the energy is delivered and the detector gain.

With recent advances in sample preparation techniques, e.g. with SELDI ProteinChip® Arrays, much of the variance in performance of LDI TOF-MS devices can be traced to variance in three variables—the laser energy delivered to the probe surface holding the sample, the area on the surface to which the energy is delivered, and the gain of the detector. Signal strength also depends upon the sensitivity of the detector. Diminishing the variance of these three variables increases the reproducibility of measurements performed with a mass spectrometer. This increased reproducibility makes the mass spectrometer more useful for measurements in which reproducibility is important, measurements such as those used for medical diagnosis.

Because the collection efficiency of the analyzer is usually fixed by design and because the sensitivity of the detector as a function of particle velocity is usually fixed by its material properties, in practice, the signal produced by a mass spectrometer device depends on the fluence of the light pulse directed at the sample presenting surface and the gain of the detector that is used to detect the ions that have desorbed from the sample presenting surface in response to that fluence. Fluence is energy per unit area in a given time interval. In a typical LDI-MS, a laser source is used to deliver energy in the form of photons to the surface of the sample. Laser focus determines the area of the sample surface into which the photons are directed. Thus, in the typical LDI-MS, the fluence may be varied by varying the energy of the light pulse delivered to the sample surface and/or varying the area on the sample surface to which the laser energy is delivered. For example, the fluence can be increased by increasing the energy of the light pulse and/or by decreasing the area on the sample presenting surface that is illuminated by the light pulse. However, having an identical fluence delivered into an identical area of an identical sample on an identical sample presenting surface may not produce a substantially identical mass spectrometer signal, since the sensitivity and gain of the detector and the characteristics of its associated electronics can be different. The gain of the detection system may be divided into three parts, namely the sensitivity of the ion detector, the gain of the ion detector, and the gain of the electronics associated with the detector. For a particular sample, the laser pulse energy and focus largely determine how many ions are created. The detector sensitivity, a function of the type of ion, determines if a particular ion hitting the detector produces an initial signal and determines the amplitude distribution of those initial signals. The gain of the detector provides an average multiplication of the initial signals. The characteristics of the electronics between the detector and digitizer also affect the recorded signal corresponding to the detected ions. So, variance between instruments or even variance of one instrument over time may result from variance in any of these characteristics of the instrument.

Accordingly, one embodiment of the present invention provides a mass spectrometer that includes a control system that interfaces with, and controls, system modules to automatically adjust the laser intensity, the focus of the laser beam, and the gain of the detection system.

II. Laser Desorption/ionizaton Mass Spectrometer with Quantitative Reproducibility—System Overview FIG. 1 illustrates a schematic view of components of a laser desorption and ionization, time-of-flight (LDI-TOF) mass spectrometer device 100 having a system for providing quantitative reproducibility in accordance with one embodiment of the present invention. Briefly, as shown, mass spectrometer device 100 includes ion optics system 120, ion detection system 125, light optics system 150 and control system 170.

As shown, ion optics system 120 includes a repeller lens 121, an extractor plate 122 and an acceleration lens 124. A mass filter (not shown) may be included, and would typically be positioned between the acceleration lens 124 and the detection system 125. As shown, extractor 122 is conical in shape and acceleration lens 124 is planar, however, other geometries, arrangements, or numbers of lenses may be used as desired. For example, both extractor 122 and acceleration lens 124 may be planar. Both extractor 122 and acceleration lens 124 have apertures through which ions pass after leaving the sample 130. A flight tube (not shown) or other enclosure typically encloses the ion optics system, the detection system, and the flight path between the ion optics system 120 and the detection system 125. This enclosure is typically evacuated so as to prevent unwanted interactions during flight of the ions.

Detection system 125 includes an ion detector 140 and a digitizer module 144. Ion detector 140 detects ions desorbed from sample 130 and produces a signal representing the detected ion flux. Examples of suitable detection elements include electron multiplier devices, other charge-based detectors, and bolometric detectors. Examples include discrete and continuous dynode electron multiplier based detectors. Digitizer 144 converts an analog signal from the detector to a digital form, e.g., using an analog-to-digital converter (ADC). A pre-amplifier 142 may be included for conditioning the signal from the ion detector 140 before it is digitized.

Mass spectrometer device 100 also includes a light optics system 150 that includes a light source 152. Light optics system 150 is designed to produce and deliver light to the sample 130. In preferred aspects, optics system 150 includes a plurality of optical elements that may condition, redirect and focus the light as desired so that light pulses of known energy, and focus, are delivered to the sample 130. Light source 152 preferably includes a laser, however, other light producing elements may be used, such an arc lamp or flash tube (e.g., xenon). The delivered light is preferably provided as one or more pulses of known duration, intensity and period. Thus, in preferred aspects, light system 150 generates and delivers pulsed laser light to sample 130.

Suitable laser-based light sources include solid state lasers, gas lasers and others. In general, the optimum laser source may be dictated by the particular wavelength(s) desired. Generally, the desired wavelengths will range from the ultraviolet spectrum (e.g., 250 nm or shorter) through the visible (e.g., 350 nm to 650 nm) and into the infrared (e.g., 1,000 nm) and far infrared. The light source may include a pulsed laser or a continuous (cw) laser with other pulse generating elements. Pulse generating elements may also appear in the light optics system downstream of the light source. For example, a continuous light source may be chopped to generate pulses just before the light impinges on the sample. Examples of suitable lasers include nitrogen lasers; excimer lasers; Nd:YAG (e.g., frequency doubled, tripled, quadrupled) lasers; ER:YAG lasers; Carbon Dioxide ($CO_2$) lasers; HeNe lasers; ruby lasers; optical parametric oscillator lasers; tunable dye lasers; excimer, pumped dye lasers; semiconductor lasers; free electron lasers; and others as would be readily apparent to one skilled in the art.

In the embodiment shown in FIG. 1, light optics system 150 also includes pulse directing element 154 and focusing element 156. Additional useful optical elements might include beam expander lens set 158, attenuator element 160, beam splitter 127 and one or more additional beam splitting elements 162. Pulse directing element 154 is configured to direct the light pulse 131 from source 152 toward sample 130. In one aspect, light directing element 154 includes a mirror configured to raster the pulses along one or more directions across the sample. However, other sets of one or more reflecting, diffracting, or refracting elements may be used. Focusing element 156 operates to adjust the focus of the light pulse 131 to obtain a desired spot size and shape at the intersection of the light pulse 131 and the sample 130. For example, focusing element 156 may focus the pulse to a circular spot or an elliptical spot of a desired size. In one aspect, focusing element 156 is controlled to automatically adjust the spot size in response to a control signal from control system 170.

Optional beam expanding lens set 158 is provided to expand the pulses to facilitate beam focusing, e.g., to a small spot size. One function of a beam expander is to reduce the divergence angle of the laser beam and help make the focused diameter of the beam smaller. Attenuator element 160, also optional, may be used to condition the intensity of the pulses or a portion of the pulses. Suitable attenuation elements include fixed or variable neutral density filters, interference filters, a filter wheel, apertures, and diffusing elements. Beam splitter element 127 is included to provide a portion of each pulse to an optical detection element 132. Optical detection element 132 may include a photosensor and associated circuitry to convert detected light into an electrical signal. For example, in one embodiment, element 132 includes a photo diode that detects the light pulse and generates a signal that is used by control system 170 for timing purposes, such as for timing the generation of an extraction field in ion optics system 120.

Beam splitting elements 162 are useful for determining output characteristics of the laser source 152. For example, beam splitter $\mathbf{162}_2$ may provide a portion of the pulse to a photosensor circuit element to determine whether a laser pulse has an anomalously high or low laser energy so that the spectrum generated due to that pulse may be rejected. Beam splitter $\mathbf{162}_1$ (and associated photosensor element) may provide a measurement of the pulse characteristics after conditioning by attenuator 160. For example, a comparison of signals from beam splitter elements $\mathbf{162}_1$ and $\mathbf{162}_2$ can be used to generate a signal to control an adjustable attenuator element 160 to reduce or increase the pulse attenuation as desired or otherwise condition the pulses as desired. Such a system can also be used to provide feedback for controlling light source 152, for example, to correct for long term drift in the energy of pulses generated by a pulsed laser. For example, if it is desirable to increase the energy of the pulses output, light source 152 may be controlled to increase the energy of the generated pulses, or a control signal may be sent to an attenuation element, e.g., element 160, to decrease the amount of attenuation.

It should be appreciated that alternate or additional optical elements may be used for conditioning the light pulses as desired. It should also be appreciated that alternate configurations of the various optical elements of optics system 150 are within the scope of the present invention.

Returning to the ion optics system 120 shown in FIG. 1, repeller 121 is preferably configured to receive a probe interface 119. Probe interface 119 is itself configured to engage a probe so that illumination (e.g., laser illumination) from the light optics system 150 illuminates a sample presenting surface on the probe. The sample presenting surface, as shown in FIG. 1, may include sample 130 deposited or otherwise formed thereon. A probe may include one or multiple sample presenting surfaces. Probe interface 119 is preferably designed to be in electrical contact with repeller 121 so that the probe interface 119, the probe, and the repeller 121 together act as a repeller. In one aspect, probe interface 119 is configured to translate the probe, and therefore the sample presenting surface, along at least one direction. For example, as shown in FIG. 1, the probe interface 119 may be configured to translate the probe in the z-direction, where the plane of FIG. 1 represents the x- and y-directions. For example, probe interface 119 may include, or be coupled to, a stepper motor or other element configured to translate the probe in a controllable manner.

Control system 170 is provided to control overall operation of mass spectrometer device 100, including automatic tuning operations such as, for example, controlling focusing element 156, attenuator 160, light source 152 and detection system 125 by automatically adjusting instrument control parameters. Control system 170 implements control logic that allows system 170 to receive user input and provide control signals to various system components.

The control logic may be provided to control system 170 using any means of communicating such logic, e.g., via a computer network, via a keyboard, mouse, or other input device, on a portable medium such as a CD, DVD, or floppy disk, or on a hard-wired medium such as a RAM, ROM, ASIC or other similar device. Control system 170 may include a stand alone computer system and/or an integrated intelligence module, such as a microprocessor, and associated interface circuitry for interfacing with the various system components of mass spectrometer device 100 as would be apparent to one skilled in the art. For example, control system 170 preferably includes interface circuitry for providing control signals to focusing element 156 to adjust the focus of the light pulses and to the pulse directing element and probe translation mechanism to control the generation of a raster pattern of light pulses on the sample presenting surface. Also, control system 170 preferably includes circuitry for receiving trigger signals from photo diode element 132, generating timing signals and for providing timing control signals to the ion optics system (e.g., ion extraction pulse signal) and to the detection system 125 (e.g., for a blanking signal).

1. Automatic Laser Energy Control

In one embodiment of the present invention, control system 170 provides signals to control and/or set the energy level of the laser beam delivered to the sample surface. Control system 170 receives as inputs a signal 102 from LEM 1, an input signal 104 from LEM 2 as well as user-inputs 106. The input signal 102 provides a measure of the energy level of the laser beam upon its exit from the laser source 152, and input signal 104 provides a measure of the energy level of the laser beam after interaction with attenuator 160. For example, in operation control system 170 may receive a user input to set the laser energy to a desired level. Control system 170 then compares the input setting to signals 102 and 104 to determine what change, if any, needs to be made to deliver the requested laser energy to the sample presenting surface. Depending on the outcome of the comparison, a signal 108 may be provided to system components, e.g., to laser 152 and/or attenuator 160, to adjust the delivered laser energy up or down. In one aspect, the energy level of at least one laser pulse is measured in this manner. The energy of several or several hundred pulses may be measured to determine how to adjust the energy level to a specified value. The specified value may be based on compiled data, based on user input or be pre-set. In one aspect, the energy is measured using at least one calibrated light meter and the energy is adjusted by adjusting an attenuator through which the laser pulse passes. In one aspect, the energy is adjusted before each laser pulse based on a measurement of the energy of a previous laser pulse or pulses.

In one embodiment, control system 170 includes electronic circuitry and firmware to set the attenuator 160 to transmit a requested laser pulse energy to the sample. In one aspect, the control system implements a lookup-table driven laser energy attenuation model, where the attenuator characteristics as a function of the position of the actuator associated with the attenuator are tabulated. The attenuator characteristic required to deliver a desired energy is calculated from some of the inputs 102, 104, and 106, and then the required actuator position is looked-up in the table. In this aspect, control system 170 includes a memory module for storing the look-up table.

In one aspect, attenuator device 160 includes a device that provides adjustable attenuation of light passing through the device. Attenuator device 160 may include an iris, a neutral density filter (NDF), a gradient NDF, a Fresnel attenuator or a piece of transparent material with either or both front and back surfaces coated with a film suitable for generating optical interference which changes the intensity of the light pulses as a function of angle of incidence. In one embodiment, a circular NDF is used.

In one aspect, control system 170 implements a method for calibrating the attenuator device 160 to provide a look-up table or mathematical function relating optical transmission to the position of the attenuator relative to the incident light or to the position of an actuator that controls the attenuation. A desired laser energy is supplied to control system 170, which sets the attenuator device to yield approximately the desired pulse energy impinging on the sample.

2. Automatic Focus Control

In another embodiment of the present invention, control system 170 provides signals to set and control the focus of the laser beam. For example, a signal may be provided to an actuator coupled to a focusing lens 156 to adjust the position of the lens in the path of the beam to thereby adjust the focal plane. Controlling the focal plane also allows for control of the area of the sample presenting surface illuminated by the laser beam. As discussed above, fluence can be varied by either or both of altering the total energy delivered to the sample surface and altering the illuminated area. For example, the fluence can be increased either by increasing the delivered energy or by decreasing the area on the sample presenting surface that is illuminated by the laser beam. So, in one aspect, focusing element 156 is controlled by control system 170 to automatically adjust the focal plane to increase or decrease the spot size of the beam on the sample presenting surface 130. Additionally, control signals may be provided to automatically adjust beam expander elements 158 to vary the beam divergence and therefore the focus of the laser beam.

Control system 170 operates, in one aspect, to set the focus of the beam to an in-focus position, as well as to adjust the focus to various offsets from the in-focus position. The offset may be preset or determined from measured characteristics of the laser beam and/or optical system. In one aspect, control system 170 determines an in-focus setting at which the area illuminated on the sample presenting surface is smallest. For example, in one aspect, control system 170 implements a process that samples an analyte signal (via detector system 125) at a plurality of different focus settings and laser energy settings to find the focus setting at which an analyte signal is detected with the lowest laser pulse energy that produces a detectable signal. In another aspect, the analyte signal is sampled at a plurality of different focus settings with a laser pulse energy adjusted to ensure that the maximum analyte signal detected lies within a specified range. The in-focus setting is then determined by using fitting or other mathematical procedures to determine the focus setting corresponding to the maximum analyte signal.

This focus setting may be stored as an in-focus setting. The process may use adjustment instructions that can be pre-set or based on a look-up table, input by the user or obtained from a database, or received by the control system or computer transmitted or received through a computer network.

3. Detector and Automatic Gain Control

In one embodiment, control system 170 provides signals to automatically set and control the gain of detector 140 in detector system 125 that is used to produce an analyte signal. As described above, the light optics system 150 performs the function of delivering a continuous or a pulsed laser beam having an adequate and adjustable energy and focus, and thus fluence and area, to desorb the sample and produce ions near the sample presenting surface. The desorbed ions are then accelerated towards the detector 140 where their arrival is detected and converted to a signal. The time-of-flight of the ions in traveling to the detector 140 is used to calculate a mass to charge ratio (m/z) as is well known. The time the process started is known, for example, based on the timing of a laser pulse and/or the creation of the extraction field.

The gain of the detector is typically controlled by a voltage applied to the detector. In one aspect, control system 170 provides an adjustment instruction signal to detector system 125, e.g., to a power supply that supplies a controllable voltage to the detector 140, to adjust the voltage and therefore the gain. The gain of the detector, which is a function of the applied voltage, may be measured manually or in an automated manner. The results are preferably stored (e.g., in a memory unit or buffer) to allow for the system to set the gain to a desired level at a later time. An adjustment instruction signal may be pre-set, input by a user or retrieved from a look-up table or database (e.g., from the memory unit). In addition, the adjustment instruction signal may be based on a signal received by the control system 170 directly from a user or over a computer network.

In one aspect, the gain of the detector is measured by measuring the average charge (e.g., number of electrons) generated when single ions hit the detector. This is done, in certain aspects, by generating spectra with few enough ions that it is rare for ions to arrive at the detector close enough together in time that they cannot be distinguished. Measurements may be restricted to high mass (and thereby slow) ions that can be expected to generate at most one secondary electron upon collision with the conversion surface of the detector. In this way, the measured detector gain is independent of the mass/velocity of the ions used for the measurement. Alternatively, measurements may be performed in a particular mass range of interest to fix the detector response (a function of both the sensitivity and gain of the detector) for ions in that mass range.

In one aspect, the gain of the detector is measured by supplying a charged particle signal of known flux into the input of the detector and measuring the output signal corresponding to this flux. Using single ions is a special case of this technique where the integrated flux is one particle.

In preferred aspects, the detector gain is periodically re-measured to compensate for changes of the detector over time such as normal aging processes due to contamination of active surfaces within the detector.

III. Conreol System

As set forth above, control system 170 is capable of individually and automatically setting and controlling the energy level of the light pulse, the focus of the light pulse and the gain of the detector. In addition, control system 170 is capable of simultaneously setting or controlling all three or any combination of these parameters. While a single control element is described, the control function of control system 170 may be implemented in multiple intelligence devices or modules, such as one or more microprocessors, Application Specific Integrated Circuits (ASIC), or the function of control system may be implemented in whole or in part as a software program that is executed in a general purpose computer. Control system 170 may also be implemented as a combination of firmware and software. User input 106 can be received from an electromechanical input mechanism, e.g., via a push button or a dial, or from a software user interface on a general purpose or dedicated computer. In addition, the user input as well as the control signals can be provided over a communication network such the Internet or an intranet. In addition to receiving and responding to user input, control system 170 may operate in a fully automatic manner.

IV. Method of Generating a Composite Time-of-flight Spectrum

The time-of-flight spectrum ultimately analyzed typically does not represent the signal from a single light pulse hitting a sample, but rather the sum of signals from a number of pulses. The measured spectra are typically composites of several spectra produced by several laser shots that are made into a composite by, e.g., adding or averaging. This reduces noise and increases dynamic range. According to one embodiment, a method of qualifying and combining qualified spectra to form a composite signal is provided to further improve instrument reproducibility. In one aspect, the method includes selecting and/or qualifying spectral portions before including them in the composite spectra. In this aspect, improved analyte signals may be obtained by prequalifying the spectral portions before combining them to form a composite spectra. Qualifying the spectral portions includes comparing the portion to a threshold or with a window parameter and then assigning a weighting factor to the portion before combining it with other portions to form the composite spectra. The weighting factor may be a normalized factor between zero and one. Various quality indicators that reflect the quality of the spectrum may be used when generating weighting factors. These spectrum quality indictors include a signal-to-noise ratio and other quality criteria such as, for example, a measure of whether the energy of the light pulse is within an acceptable energy range, and a measure of whether the spectral signal is within a specified signal range or ranges over a particular mass range or ranges. For example, spectra that include signals truncated by the signal recording system may be assigned zero weight so that signal distortions caused by the truncation are not included in the composite spectrum. Another example of a quality criterion might be a measure of a spectral signal integrated across a mass range.

In accordance with one embodiment of the present invention, a method of generating a composite time-of-flight spectrum includes delivering a laser pulse to an analyte sample on a sample presenting surface to desorb and ionize analyte from the surface. The method also includes measuring the energy of the laser pulse and detecting desorbed and ionized analyte and generating a time-of-flight spectrum of the detected analyte. Then an evaluation is made of the energy that was delivered to the sample surface and the measured energy is compared to an energy acceptance criterion. The generated spectrum is also evaluated based on a spectrum acceptance criterion. Following the evaluations, a weighting factor is applied to the generated spectrum and the weighted spectrum is included into the composite spectrum. The laser pulse energy evaluation includes determining whether the measurement falls within a specified energy range. The spectrum evaluation criteria is based on an analyte signal or a time integrated analyte signal over a specified mass and/or a specified time-of-flight range or ranges. After the evaluations, the composite spectrum is derived, in one aspect, by applying a function to a plurality of spectra generated from the same sample, where the function is the weighted sum or average of intensities of the spectra as a function of time-of-flight or mass.

Figure 2:
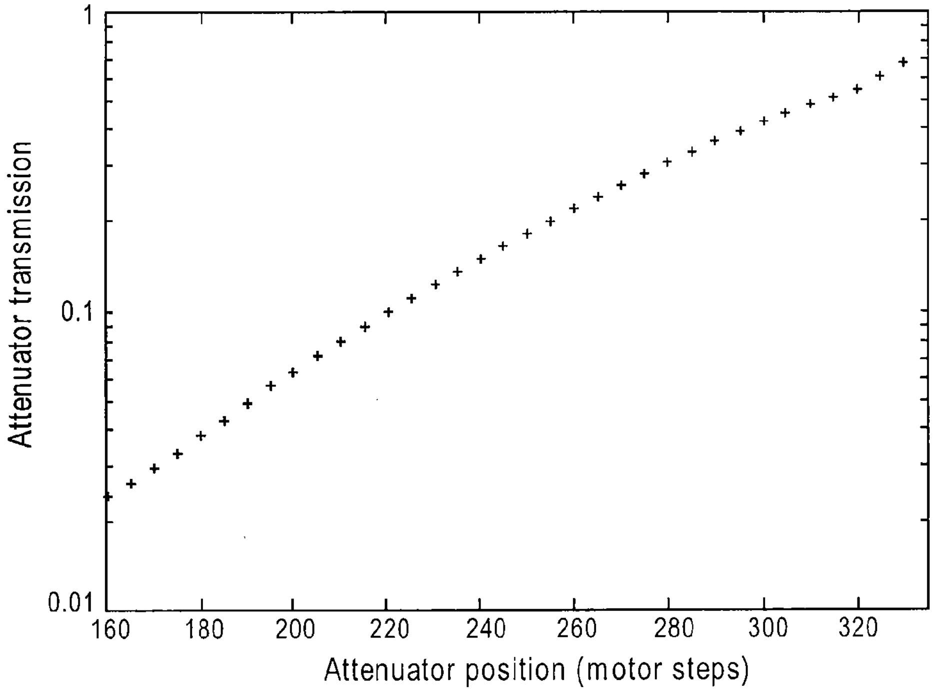
FIG. 2 is data from an automatic calibration of an attenuator. The transmission coefficient of the attenuator is plotted against the position of the actuator that moves the attenuator.

V. An Example of a System Capable of Generating Quantitatively Reproducible Spectra The Ciphergen Biosystems, Inc. Protein Chip® System, series 4000 (PCS4000) is one example of a mass spectrometer device that implements the systems and methods described herein. In this instrument, calibrated light meters are used to monitor the output of the laser used as a light source. The last 1000 measurements of the output of the laser are averaged and used to adjust a variable attenuator such that the energy delivered to the sample on the next series of laser firings will be substantially the energy requested by the operator of the instrument. This method automatically compensates for changes over time in the pulse energy provided by the laser. The adjustment of the attenuator requires that the transmission characteristic of the attenuator and the optical characteristics of the other optical elements are known. The transmission characteristic of the attenuator as a function of the positioning of the actuator used to adjust the attenuator is automatically measured by the instrument before the attenuator is used for the first time. An example of the measured attenuator characteristic is shown in FIG. 2. Note that it is possible to measure a representative sample of the light pulse delivered to the sample and to use this measurement in conjunction with an adjustable attenuator to control the energy of subsequent light pulses. This method has the advantage that only the optical characteristics of the optics used to take the representative sample of a light pulse must be known and stable. This method will automatically compensate for changes that occur in optical elements preceding those used to generate the representative sample of the light pulse.

Figure 3:
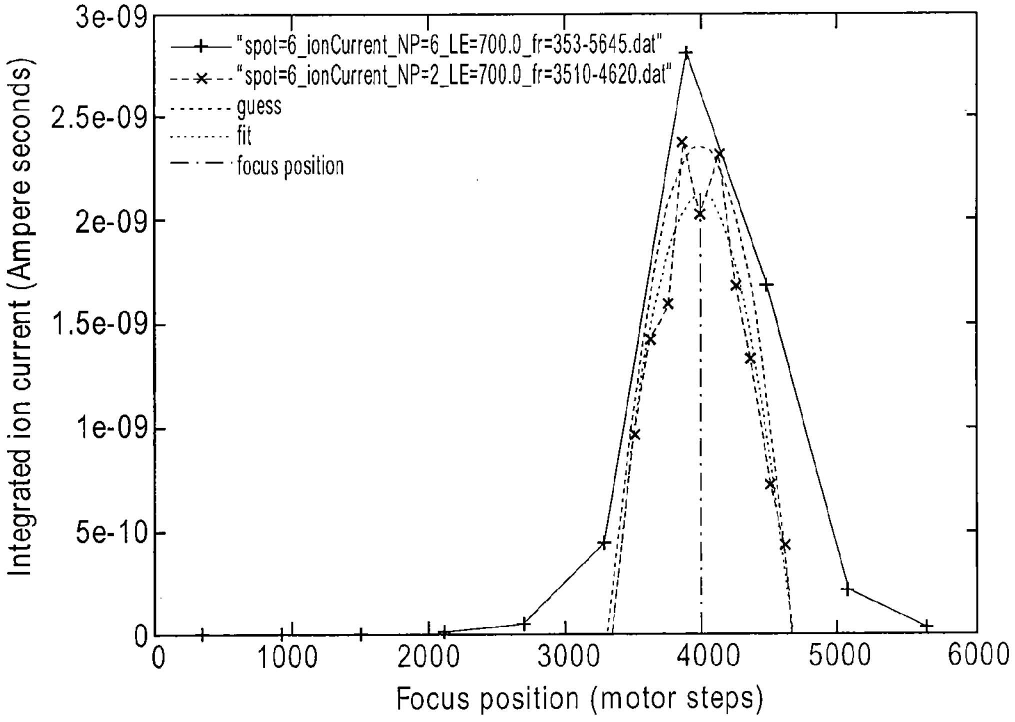
FIG. 3 is data from an automatic focus routine. The integrated ion current in a spectrum is plotted against the position of the focusing system. The curves (in order) include widely spaced measurements across a wide range of focus settings, closely spaced measurements across the peak found in the widely space measurements, the guess (initial estimate) used by the fitting routine, the final fit to the closely spaced data, and the focus position determined from the fit.

In the PCS4000, the focus of the laser on the sample is automatically determined. This is accomplished, in one aspect, with the following steps: 1) samples of the analyte used for focusing are place in the instrument; 2) the optical system is set to deliver a light pulse of desired energy to the sample; 3) spectra of the analyte are acquired at different settings of the actuator controlling the focusing lens; 4) the integrals of these spectra over the arrival time corresponding to the analyte are calculated; 5) if the maximum of these calculated integrals do not lie within a desired range of values, the desired energy of the light pulses used is adjusted and steps 2) to 5) are repeated until the maximum lies within the desired range; and 6) the actuator position expected to produce the maximum integrated spectrum of the analyte is estimated from these measurements. This actuator position is taken to be the in-focus position of the actuator and focus lens. Before step 6), another set of spectra may be acquired with different spacing of the setting of the actuator over a different actuator range to improve the accuracy of the estimate of the in-focus position. An example of the data and analysis used to determine the in-focus position is shown in FIG. 3. The operating focus position relative to the in-focus position is determined by the requirements of each particular application and by the characteristics of the light source on each instrument. These define an offset applied to the in-focus position to achieve the operating focus position appropriate for that particular application. A light source with more consistent instrument-to-instrument characteristics would minimize or eliminate the dependence of the offset on the characteristics of the light source.

Figure 4:
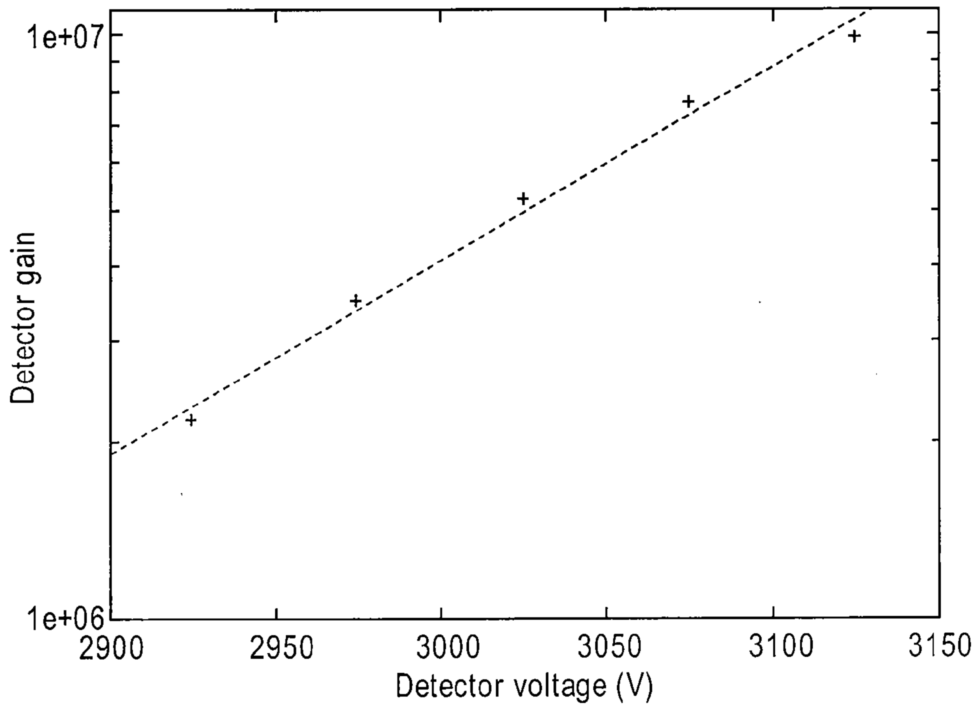
FIG. 4 is data from an automatic measurement of the gain of the detector as a function of the voltage applied to the detector. The pluses are measured points and the line is a tabulated curve used by the instrument.

In the PCS4000, the gain of the detector is controlled by a voltage applied to the detector. This voltage is typically in the range of 2500 V to 4500 V. The gain of the detector as a function of the applied voltage changes as the detector ages and as the detector is used. In the PCS4000, the gain of the detector as a function of the applied voltage is periodically measured and the result of this measurement is used during spectrum acquisition to allow operation with a substantially known and controlled detector gain. The gain measurement is performed by setting the voltage applied to the detector to a particular voltage and then collecting a large number of signals that correspond to the impact of a single ion on the sensitive area of the detector. These signals are analyzed to determine the gain of the detector. This procedure is then repeated for a number of different applied voltages. The data generated is used to create a table. During subsequent acquisition of spectra this table is used to determine the voltage to apply to the detector such that the detector operates substantially with a desired gain. An example of the automatically measured data and the curve used to generate the table is shown in FIG. 4.

Figure 5:
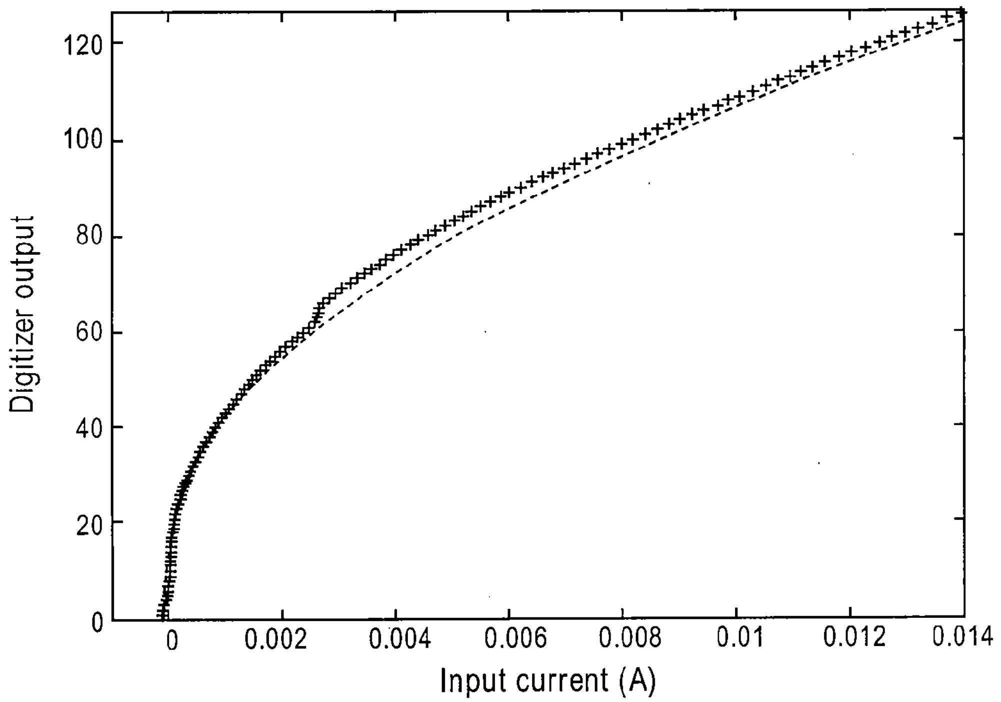
FIG. 5 is data from an automatic characterization of the electronics from the detector to and including the digitizer. The digitizer output is plotted against the input current (the current output by the detector). The pulses are measured points and the line is the desired transfer function of the electronics. The kink in the data is an intended artifact of the architecture of the digitizer.

In the PCS4000, the electronics between the detector and the digitization system are periodically and automatically calibrated. Details of these electronics are discussed in U.S. Provisional application Ser. Nos. 60/585,350, filed Jul. 1, 2004, 60/588,641, filed Jul. 15, 2004, and 60/686,680, filed Jun. 1, 2005, each titled "NON-LINEAR SIGNAL AMPLIFIERS AND USES THEREOF IN A MASS SPECTROMETER DEVICE", the contents of each of which are hereby incorporated by reference. An example of this calibration is shown in FIG. 5.

Figure 6A:
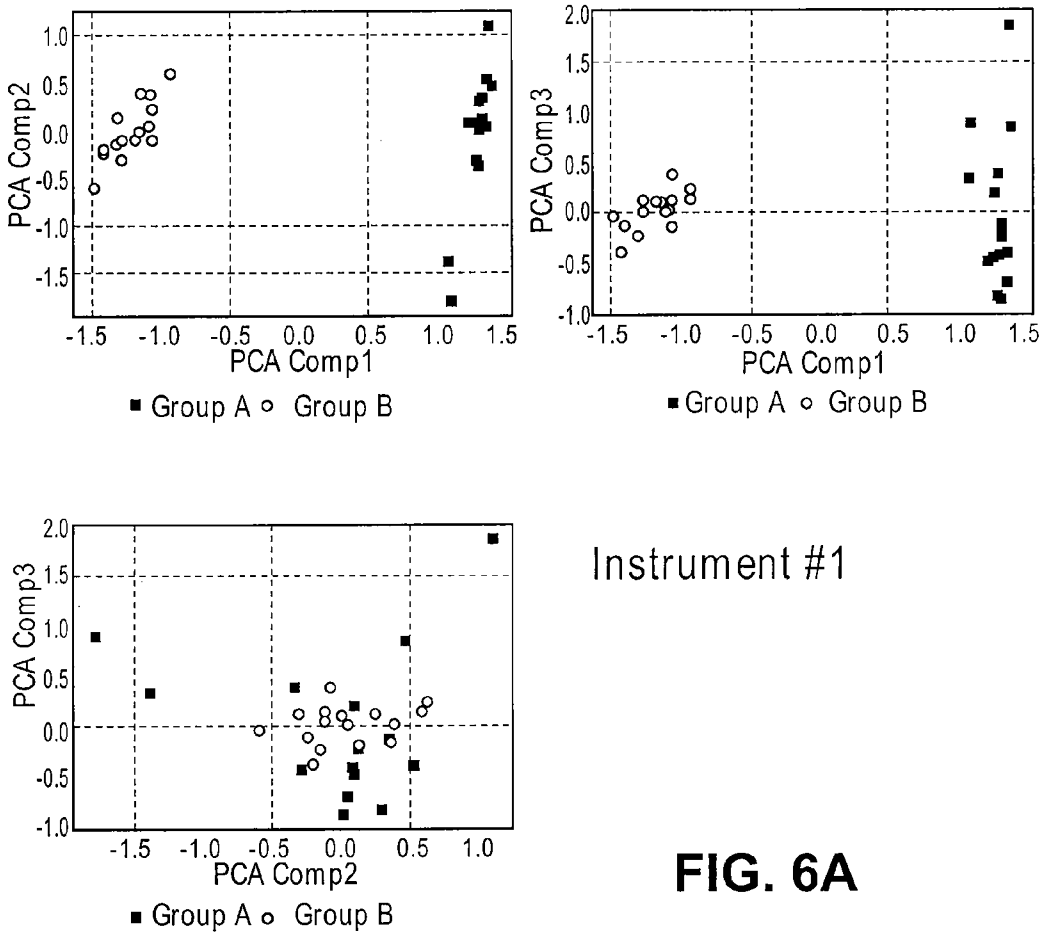
FIG. 6 is the principle component analysis (A) showing the separation of the group A and group B samples on instrument #1, (B) showing the separation of the group A and group B samples on instrument #2, (C) showing the separation of the group A and group B samples on the pooled data of instruments #1 and #2, (D) the same data as in FIG. 6C but colored to show how the data is not separated by instrument.
Figure 6B:
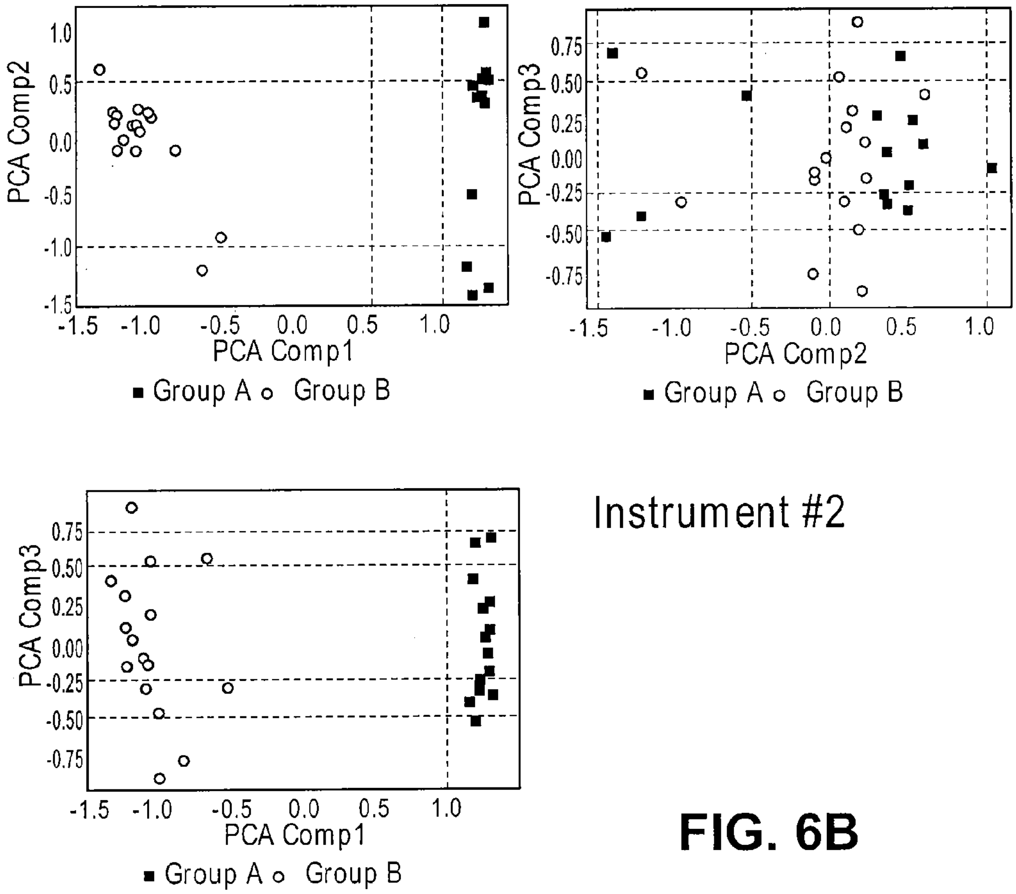
Figure 6C:
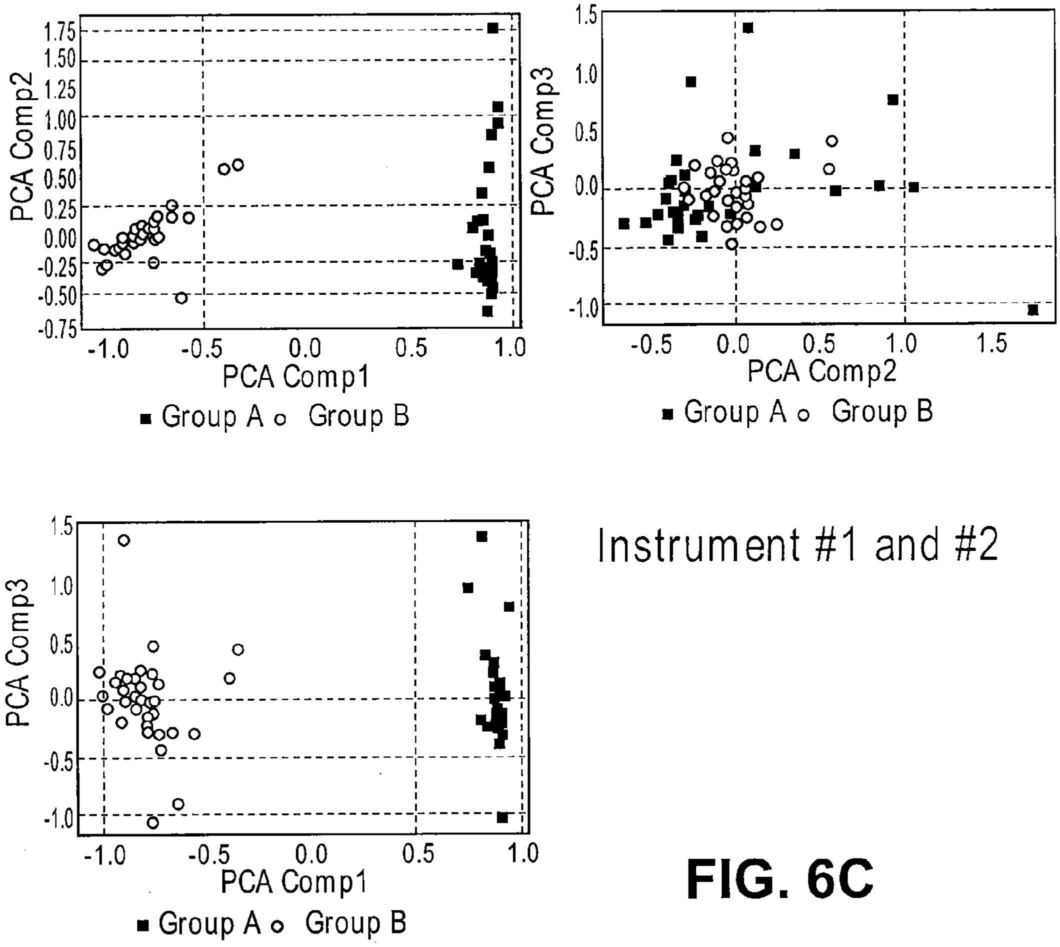
Figure 6D:
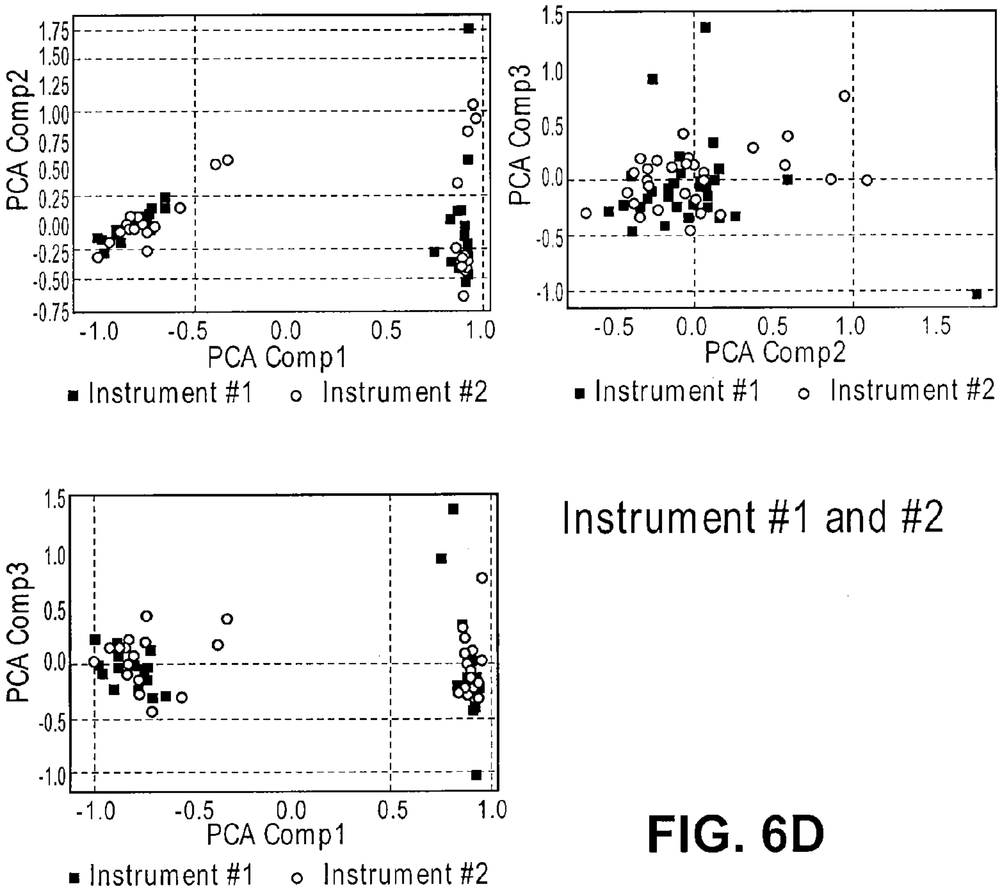

With the PCS4000, the difference in response between instruments has been made negligibly small by appropriately choosing the light source dependent offset of the focus position. This has been demonstrated in two ways: (1) by running identical samples of human serum on each instrument, selecting peaks corresponding to different proteins across a wide range of masses, and comparing the average intensity of these peaks as measured on each instrument. Examples of such data for two instruments is tabulated in Table 1, below. Note that the peak intensities shown in Table 1 are normalized to the average of the peak intensities measured by the two instruments to make it easy to see the difference in peak intensities. As shown in Table 1, the median peak height difference for the 29 peaks is less than 7%. (2) by conducting a protein profiling experiment where the data was analyzed for each instrument separately and for data from both instruments pooled into a single data set. In a profiling experiment, samples are typically taken from both a population with a particular disease and from a healthy population. The experiment looks for systematic differences in the quantity of each protein detected in the diseased versus the healthy population. When an experiment of this type was performed with two PCS4000 instruments, both instruments clearly differentiated between the diseased and healthy sample populations and there was no visible grouping of the results by instrument. Principle component analysis is often used to find systematic differences between data sets. Principle component analysis (PCA) of the data for this experiment is shown in FIG. 6. FIGS. 6A and 6B show the principle component analysis performed on each instrument independently and FIG. 6C shows the same analysis for the data pooled from both instruments. A clear distinction between the sample groups is seen for all three data sets. FIG. 6D shows the same data as FIG. 6C except the data is colored to distinguish between the two instruments. No visible seperation into distinct groups occurs based on instrument. In both of these experiments, the same acquisition protocol was used to specify the acquisition conditions on each of the instruments. This protocol contains the parameters necessary to accommodate different types of samples including, most importantly, the energy of each laser pulse to be delivered to the sample and the number of pulses to be delivered to each part of the sample. Currently on the PCS4000 the illuminated area and the gain of the detector are generally determined by the type of protocol used and are not generally under user control.

TABLE 1

| | Substance | Relative Peak Intensities compared to average across instruments | |
|---|---|---|---|
| Peak # | Mass (Da) | Instrument 1 | Instrument 2 |
| 1 | 4152 | 96.78% | 103.22% |
| 2 | 4184 | 92.62% | 107.38% |
| 3 | 4281 | 95.72% | 104.28% |
| 4 | 6626 | 101.51% | 98.49% |
| 5 | 6936 | 102.62% | 97.38% |
| 6 | 7610 | 106.45% | 93.55% |
| 7 | 7928 | 104.60% | 95.40% |
| 8 | 8595 | 103.86% | 96.14% |
| 9 | 8819 | 105.36% | 94.64% |
| 10 | 8926 | 103.40% | 96.60% |
| 11 | 9300 | 106.63% | 93.37% |
| 12 | 10063 | 108.49% | 91.51% |
| 13 | 10266 | 111.20% | 88.80% |
| 14 | 11724 | 104.18% | 95.82% |
| 15 | 13749 | 104.81% | 95.19% |
| 16 | 13877 | 110.28% | 89.72% |
| 17 | 14058 | 101.84% | 98.16% |
| 18 | 15125 | 113.55% | 86.45% |
| 19 | 15867 | 111.67% | 88.33% |
| 20 | 17404 | 107.57% | 92.43% |
| 21 | 28133 | 100.48% | 99.52% |
| 22 | 33386 | 98.96% | 101.04% |
| 23 | 39826 | 100.51% | 99.49% |
| 24 | 44724 | 94.75% | 105.25% |

TABLE 1-continued

| Peak # | Substance Mass (Da) | Relative Peak Intensities compared to average across instruments Instrument 1 | Instrument 2 |
|---|---|---|---|
| 25 | 51378 | 97.74% | 102.26% |
| 26 | 60461 | 101.31% | 98.69% |
| 27 | 66925 | 101.09% | 98.91% |
| 28 | 79633 | 106.60% | 93.40% |
| 29 | 108230 | 101.59% | 98.41% |
| | Average difference | 100.42% | 99.58% |

Achieving this level of instrument independent performance with only one instrument dependent parameter is extraordinary. There are various methods by which either the need for this instrument dependent parameter can be eliminated or by which this parameter can be automatically measured, for example: 1) by using a light source with more consistent unit-to-unit characteristics the methods discussed herein will provide instrument independent performance without any adjustable parameters, 2) by automatically characterizing the light source in situ by measuring its divergence, 3) by calibrating each light source (for example by measuring its divergence and/or cross section intensity distribution) and installing the light source and calibration together on an instrument.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A laser desorption mass spectrometer device, comprising:

(a) an optical assembly comprising a laser and optical elements configured to deliver a laser pulse having a controllable energy over a controllable area of a sample presenting surface, wherein the pulse delivered to the sample presenting surface desorbs and ionizes analyte molecules from the surface;

(b) a detector having a controllable gain configured to detect desorbed and ionized analyte molecules from the surface;

(c) means for automatically controlling the energy of the laser pulse delivered to said sample presenting surface;

(d) means for automatically controlling the area of said sample presenting surface illuminated by the laser pulse; and (d) means for automatically controlling the gain of said detector.

2. The device of claim 1 wherein:

said means for automatically controlling the energy comprises means for setting the energy of the laser pulse delivered to the surface to a specified value;

said means for automatically controlling the area comprises means for focusing the laser pulse to illuminate a specified area on the sample presenting surface; and said means for automatically controlling the gain comprises means for setting the gain to a specified value.

3. The device of claim 2 wherein said means for setting the energy to a specified value comprises means for measuring laser pulse energy and means for adjusting laser pulse energy based on the measurement.

4. The device of claim 2 wherein said means for means for focusing the laser pulse comprises means for measuring the focus and means for adjusting the focus based on the measurement.

5. The device of claim 4 wherein said means for focusing the laser pulse comprises a computer configured to receive the measurement and to transmit adjustment instructions based on the measurement.

6. The device of claim 2 wherein said means for automatically controlling the gain comprises means for measuring the gain and means for adjusting the gain based on the measurement.

7. The device of claim 6 wherein said means for automatically controlling the gain comprises a computer configured to receive the measurement and to transmit adjustment instructions based on the measurement.

8. The device of claim 2 wherein said means for setting the energy delivered to the surface to a specified value comprises an attenuator and an actuator coupled with said attenuator for adjusting the energy.

9. The device of claim 2 wherein said means for focusing the laser pulse comprises a lens and an actuator coupled to the lens for adjusting the area of the sample presenting surface illuminated.

10. The device of claim 2 wherein said means for focusing the laser pulse comprises means for determining an in-focus setting at which the area illuminated on the sample presenting surface is smallest; and means for off-setting the focus to illuminate the specified area.

11. The device of claim 10 wherein the means for determining the in-focus setting comprises one of:

a) a computer algorithm that samples analyte signal at a plurality of different focus settings and energy settings to find the focus setting at which analyte signal can be detected at the lowest energy, which focus setting is the in-focus setting, or b) a computer algorithm that samples analyte signal at a plurality of different focus settings to find the focus setting at which analyte signal is at a maximum for laser energies where the maximum lies within a specified analyte signal range, which focus setting is the in-focus setting.

12. The device of claim 2 wherein said means for setting the gain comprises a power supply that supplies a controllable voltage to the detector.

13. The device of claim 2 wherein the means for setting the energy of the laser pulse, the means for focusing the laser pulse and the means for setting the gain comprise one or more computers that transmit adjustment instructions to said means.

14. The device of claim 13 wherein said adjustment instructions are pre-set or based on a look-up table.

15. The device of claim 13 wherein said adjustment instructions are input by the user or obtained from a database.

16. The device of claim 13 wherein said computer transmits and receives the instructions through a computer network.

17. A method of setting operating parameters of a laser desorption mass spectrometer device, comprising:

(a) providing a device comprising:

(1) an optical assembly comprising a laser and optical elements configured to deliver a laser pulse having a controllable energy over a controllable area of a sample presenting surface, wherein the pulse delivered to the sample presenting surface desorbs and ionizes analyte molecules from the surface;

(2) a detector having a controllable gain configured to detect analyte molecules desorbed from the surface and ionized;

(3) means for automatically controlling the energy of the laser pulse delivered to said sample presenting surface;

(4) means for automatically controlling the area of said sample presenting surface illuminated by the laser pulse; and (5) means for automatically controlling the gain of said detector;

(b) automatically controlling at least one of the following:

(1) the energy of the laser pulse delivered to said sample presenting surface;

(2) the area of said sample presenting surface illuminated by the laser pulse; and (3) the gain of said detector.

18. The method of claim 17 comprising automatically controlling all of:

(1) the energy of the laser pulse delivered to said sample presenting surface;

(2) the area of said sample presenting surface illuminated by the laser pulse; and (3) the gain of said detector.

19. The method of claim 17 wherein automatically controlling the energy comprises measuring the energy of at least one laser pulse; and adjusting the energy to a specified value based on the measurement.

20. The method of claim 19 wherein the energy is measured using at least one calibrated light meter and the energy is adjusted by adjusting an attenuator through which the laser pulse passes.

21. The method of claim 19 wherein automatically controlling energy comprises executing a computer program that determines and transmits adjustment instructions to means for adjusting the energy.

22. The method of claim 19 comprising measuring the energy of at least 100 laser pulses, and adjusting the energy to a specified value based on the measurements.

23. The method of claim 19 wherein the specified value is based on compiled data, is input by a user or is pre-set.

24. The method of claim 19 wherein the energy is adjusted before each laser pulse and the measurement includes a measurement of the energy of a previous laser pulse.

25. The method of claim 19 comprising transmitting over a network information used in generating instructions to adjust the energy.

26. The method of claim 17 wherein automatically controlling the area illuminated comprises automatically determining an in-focus setting at which the area illuminated on the sample presenting surface is smallest; and off-setting the focus to illuminate a specified area.

27. The method of claim 26 wherein determining the in-focus setting includes one of:

a) executing a computer algorithm that samples analyte signal at a plurality of different focus settings and energy settings to find the focus setting at which analyte signal can be detected at the lowest laser pulse energy, which focus setting is the in-focus setting, or b) executing a computer algorithm that samples analyte signal at a plurality of different focus settings to find the focus setting at which analyte signal is at a maximum for laser energies where the maximum lies within a specified analyte signal range, which focus setting is the in-focus setting.

28. The method of claim 26 wherein automatically controlling the area comprises executing a computer program that determines and transmits adjustment instructions to means for adjusting the area.

29. The method of claim 26 comprising transmitting over a network information used in generating instructions to off-set the focus.

30. The method of claim 17 wherein automatically controlling the gain comprises measuring gain and automatically adjusting the gain to a specified value based on the measurement.

31. The method of claim 30 wherein the specified value is based on compiled data, is input by a user or is pre-set.

32. The method of claim 30 wherein automatically controlling the gain comprises executing a computer program that determines and transmits adjustment instructions to means for adjusting the gain.

33. The method of claim 30 comprising transmitting over a network information used in generating instructions to adjust the gain.

34. A method of generating a composite time-of-flight spectrum comprising:

delivering a laser pulse having an energy to an analyte sample on a sample presenting surface to desorb and ionize analyte from the surface;

measuring the energy of the laser pulse;

detecting desorbed and ionized analyte and generating a time-of-flight spectrum of the detected analyte; and one or both of:

i) evaluating the measured energy based on an energy acceptance criterion, and including the time-of-flight spectrum into a composite spectrum if the energy acceptance criterion is met; and ii) evaluating the spectrum based on a spectrum acceptance criterion, and including the time-of-flight spectrum into a composite spectrum if the acceptance criteria for both the time-of-flight spectrum and the measured energy are met.

35. The method of claim 34, wherein the spectrum is included in the composite spectrum with a weight based on the energy or spectrum acceptance criteria.

36. The method of claim 34, wherein the spectrum acceptance criterion relates to an analyte signal within at least one specified intensity range and within at least one specified time-of-flight range.

37. The method of claim 34, wherein the spectrum acceptance criterion relates to an integrated analyte signal within specified signal range and within a specified time-of-flight range.

38. The method of claim 34, wherein the composite spectrum is derived by applying a function to a plurality of spectra generated from the same sample.

39. The method of claim 38 wherein the function is the sum or average of intensities of the spectra as a function of time-of-flight.

40. The method of claim 34, wherein evaluating the measured energy comprises determining whether the measurement falls within a specified energy range.

41. A laser desorption mass spectrometer device, comprising:

an optical assembly comprising a laser and optical elements configured to deliver a laser pulse having a controllable energy over a controllable area of a sample presenting surface, wherein the pulse delivered to the sample presenting surface desorbs and ionizes analyte molecules from the surface;

a detector having a controllable gain configured to detect desorbed and ionized analyte molecules from the surface; and a control module configured to provide control signals to the optical assembly and to the detector to automatically control one or more of:

(a) the energy of the laser pulse delivered to said sample presenting surface, (b) the area of said sample presenting surface illuminated by the laser pulse, and (c) the gain of said detector.

* * * * *